United States Patent
Lee et al.

(10) Patent No.: US 10,019,423 B2
(45) Date of Patent: Jul. 10, 2018

(54) METHOD AND APPARATUS FOR CREATING ELECTRONIC DOCUMENT IN MOBILE TERMINAL

(71) Applicant: Samsung Electronics Co., Ltd., Suwon-si, Gyeonggi-do (KR)

(72) Inventors: Yohan Lee, Seongnam-si (KR); Giyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 14/315,745

(22) Filed: Jun. 26, 2014

(65) Prior Publication Data

US 2015/0007076 A1    Jan. 1, 2015

(30) Foreign Application Priority Data

Jun. 27, 2013 (KR) ........................ 10-2013-0074287

(51) Int. Cl.
*G06F 3/048* (2013.01)
*G06F 17/24* (2006.01)
*G06F 3/0488* (2013.01)
*G06F 3/0485* (2013.01)

(52) U.S. Cl.
CPC ............ *G06F 17/24* (2013.01); *G06F 3/0485* (2013.01); *G06F 3/0488* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 7,802,202 B2 * | 9/2010 | Fox | .......................... | G06F 3/038 715/831 |
| 8,890,808 B2 * | 11/2014 | Nan | ......................... | G06F 3/033 345/156 |
| 2004/0268263 A1 * | 12/2004 | Van Dok | .................. | G09G 5/14 715/733 |
| 2006/0161870 A1 * | 7/2006 | Hotelling | .............. | G06F 3/0485 715/863 |
| 2006/0209016 A1 * | 9/2006 | Fox | ......................... | G06F 3/038 345/156 |
| 2006/0209040 A1 * | 9/2006 | Garside | ............... | G06F 3/03545 345/173 |

(Continued)

FOREIGN PATENT DOCUMENTS

EP    2 105 826 A2    9/2009
EP    2 696 270 A1    2/2014
(Continued)

*Primary Examiner* — Hua Lu
(74) *Attorney, Agent, or Firm* — Jefferson IP Law, LLP

(57) ABSTRACT

A method of creating an electronic document in a mobile terminal is provided. The method includes displaying an electronic document screen, sensing a hover-in event of an input unit when the electronic document screen is displayed, enlarging a size of the electronic document screen in response to the hover-in event of the input unit, creating the electronic document according to a user input on the enlarged electronic document screen, sensing a hover-out event of the input unit when the enlarged electronic document is displayed, and reducing a size of the enlarged electronic document screen in response to the hover-out event of the input unit.

10 Claims, 10 Drawing Sheets

(56) References Cited

U.S. PATENT DOCUMENTS

| | | | |
|---|---|---|---|
| 2009/0213084 A1* | 8/2009 | Kramer | G06F 3/04883 345/173 |
| 2009/0237371 A1 | 9/2009 | Kim et al. | |
| 2009/0315848 A1* | 12/2009 | Ku | G06F 3/0416 345/173 |
| 2011/0018811 A1* | 1/2011 | Miernik | G06F 3/0416 345/173 |
| 2011/0109581 A1* | 5/2011 | Ozawa | G06F 3/0481 345/173 |
| 2012/0102436 A1* | 4/2012 | Nurmi | G06F 1/1613 715/863 |
| 2012/0169776 A1* | 7/2012 | Rissa | G06F 3/04883 345/676 |
| 2012/0188183 A1* | 7/2012 | Heo | G06F 3/0416 345/173 |
| 2012/0229450 A1* | 9/2012 | Kim | G06F 3/04815 345/419 |
| 2013/0050131 A1* | 2/2013 | Lee | G08G 1/09626 345/174 |
| 2013/0100074 A1* | 4/2013 | Chang | G06F 3/044 345/174 |
| 2013/0241827 A1* | 9/2013 | Ronkainen | G06F 3/0488 345/157 |
| 2013/0328786 A1* | 12/2013 | Hinckley | G06F 3/033 345/173 |
| 2014/0108979 A1* | 4/2014 | Davidson | G06F 3/0481 715/765 |
| 2014/0129990 A1* | 5/2014 | Xin | G06F 3/017 715/849 |
| 2014/0160063 A1* | 6/2014 | Yairi | G06F 3/044 345/174 |
| 2014/0218343 A1* | 8/2014 | Hicks | G06F 3/04883 345/179 |
| 2014/0282269 A1* | 9/2014 | Strutt | G06F 3/04883 715/863 |
| 2014/0359410 A1 | 12/2014 | Lee | |
| 2014/0362119 A1* | 12/2014 | Freund | G06F 3/017 345/661 |

FOREIGN PATENT DOCUMENTS

| | | |
|---|---|---|
| KR | 10-2014-0141211 A | 12/2014 |
| WO | 2012/132802 A1 | 10/2012 |

* cited by examiner

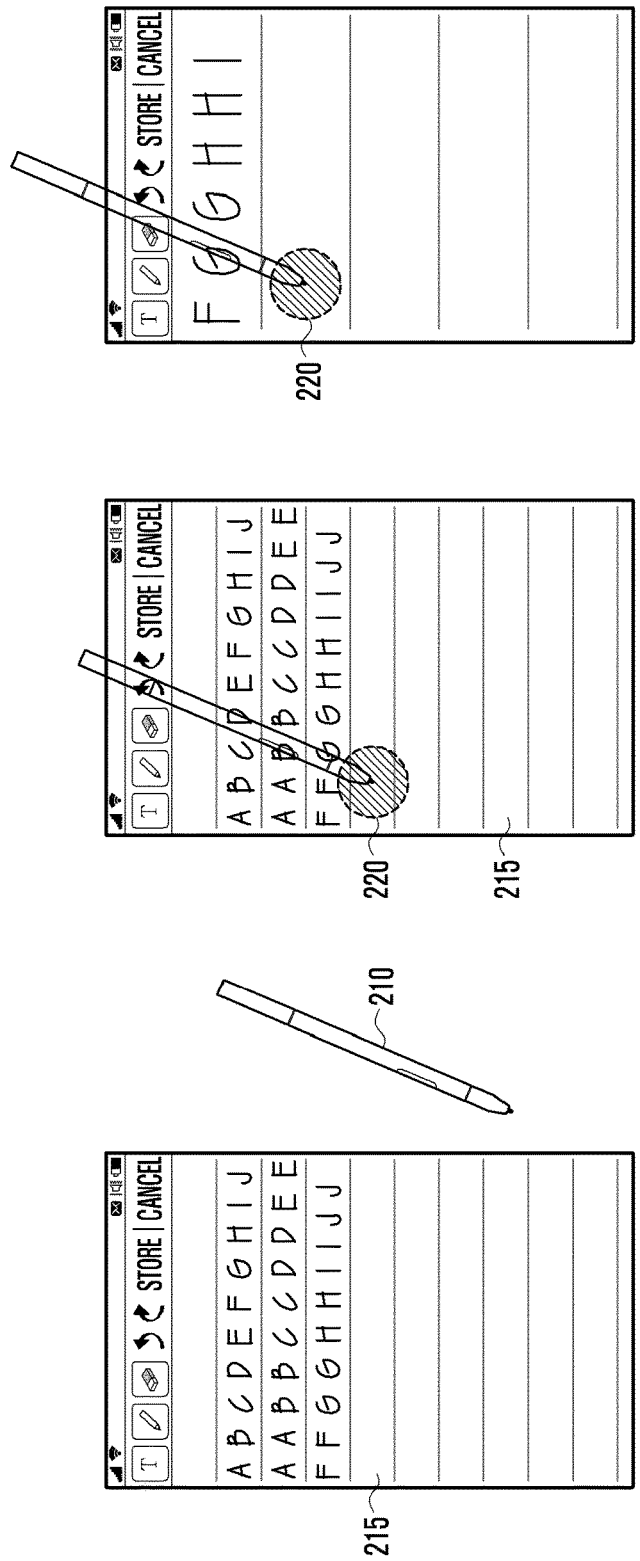

METHOD AND APPARATUS FOR CREATING ELECTRONIC DOCUMENT IN MOBILE TERMINAL

CROSS-REFERENCE TO RELATED APPLICATION(S)

This application claims the benefit under 35 U.S.C. § 119(a) of a Korean patent application filed on Jun. 27, 2013 in the Korean Intellectual Property Office and assigned Serial number 10-2013-0074287, the entire disclosure of which is hereby incorporated by reference.

TECHNICAL FIELD

The present disclosure relates to a method and an apparatus for creating an electronic document in a mobile terminal. More particularly, the present disclosure relates to a method and an apparatus for creating an electronic document in a mobile terminal which can input data by using a hovering operation when creating the electronic document displayed in a display unit.

BACKGROUND

As digital technology has developed, various types of electronic devices (e.g., a mobile communication terminal, a Personal Digital Assistant (PDA), an electronic organizer, a smart phone, a tablet Personal Computer (PC), and the like) that can perform communications and process private information have been released. The abilities of these electronic devices have continued to evolve and now encompass areas of other electronic devices, thus reaching a mobile convergence stage. For example, a mobile terminal is now able to provide different kinds of functions in addition to voice communication such as a video communication, a message transmitting and receiving function (e.g., a Short Message Service (SMS)/a Multimedia Message Service (MMS), and an e-mail), a navigation function, a function of creating a document (e.g., a memo, or an office document), a image capturing function, a broadcasting reproducing function, a function of reproducing media (e.g., moving images and music), an Internet function, a messenger function, a Social Networking Service (SNS) function, and the like.

Further, the supply of electronic devices having a touch screen has rapidly increased. And, thanks to the introduction of the touch screen, the user can operate the electronic apparatus more conveniently. That is, the user can perform a desired operation by touching the touch screen with a finger or an electronic pen (e.g., a stylus pen). For example, if the user performs hand writing by using the electronic pen, the electronic device can perform an operation (e.g., a drawing function) of storing the hand writing as a drawing object or an operation (e.g., a hand writing recognizing function or a geometric figure recognizing function) of analyzing stroke data (e.g, a coordinate value) and converting the stroke data into a text, a figure, or the like.

In one case, the user can input various objects such as a text or a picture by using a touch input in an electronic document (e.g., a note, a memo, and a web page) displayed on the touch screen more conveniently than in a method of using physical keys according to the related art.

However, the electronic device has a limited screen size such that the size of the displayed electronic document screen is limited. Accordingly, when the user creates the electronic document, it may be difficult for the user to create the electronic document in a desired object and document formats at a desired position. Further, if the user inputs a bigger object than the given size of the electronic document screen, the space utilization of the electronic document may not be efficiently used. That is, if the user inputs a big object, the user may not sufficiently use the entier space of a page of the electronic document and must continuously create an object on the next page. In this case, it may be inconvenient for the user to create the document, and it may be difficult for the user to check the entire edition state of the document as one document is divided into pages.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for displaying an editable page and enabling the user to easily input various objects by the corresponding page.

Another aspect of the present disclosure is to provide a method and an apparatus that can enhance user convenience in inputting an object by using a hovering gesture over an electronic document displayed on a display unit.

Still another aspect of the present disclosure is to provide a method and an apparatus that can enhance user convenience in creating an electronic document by enlarging an electronic document screen or reducing an enlarged electronic document screen in response to a hovering event of an input unit when the electronic document is displayed.

Still another aspect of the present disclosure is to provide a method and an apparatus for displaying an electronic document by enlarging a size of an electronic document screen if an input unit performs a hover-in event on a screen when the electronic document is displayed, supporting an input of an object in a state where the enlarged electronic document screen is maintained, and displaying the electronic document screen by reducing the size of the electronic document screen to an original size of the electronic document screen if the input unit performs a hover-out event on the enlarged electronic document screen.

Another aspect of the present disclosure is to provide a method and an apparatus that can enable the user to conveniently create an electronic document by causing the electronic document screen to be enlarged, reduced, or created by one operation.

In accordance with an aspect of the present disclosure, a method for creating an electronic document in a mobile terminal is provided. The method includes displaying an electronic document screen, sensing a hover-in event of an input unit when the electronic document screen is displayed, enlarging a size of the electronic document screen in response to the hover-in event of the input unit, creating the electronic document according to a user input on the enlarged electronic document screen, sensing a hover-out event of the input unit when the enlarged electronic document is displayed, and reducing a size of the enlarged electronic document screen in response to the hover-out event of the input unit.

In accordance with another aspect of the present disclosure, an apparatus for creating an electronic document in a mobile terminal is provided. The apparatus includes a display unit configured to display an electronic document screen, a touch sensor configured to detect a user input when the electronic document screen is displayed, and a controller configured to perform a control so that the electronic document screen is enlarged and displayed if an input unit performs a hover-in event when the electronic document screen is displayed, the electronic document screen is created according to the user input on the enlarged electronic document screen, and the enlarged electronic document screen is reduced and displayed if the input unit performs a hover-out event over the enlarged electronic document screen.

As described above, according to embodiments of the present disclosure, an electronic document screen can be enlarged or reduced according to a hovering gesture of the user in a state where an editable electronic document is displayed, and accordingly the user can conveniently and correctly input various objects (texts, images, pictures, and the like) to the enlarged electronic document screen. According to embodiments of the present disclosure, if an input unit of the user performs a hover-in event, the electronic document can be enlarged and provided, and the user can more conveniently create an electronic document including various objects in the mobile terminal. Further, embodiments of the present disclosure have an advantage of creating an electronic document more conveniently by causing zoom-in/out functions and an electronic document creating function in the electronic document screen to be operated by one user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, 2C, 2D, and 2E are diagrams illustrating operations for creating an electronic document by using an electronic pen in a mobile terminal according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure shown and described in this specification and the drawings correspond to specific examples presented in order to easily explain technical contents of the present disclosure, and to help comprehension of the present disclosure, but are not intended to limit the scope of the present disclosure. It is obvious to those skilled in the art to which the present disclosure pertains that other modified embodiments on the basis of the spirit of the present disclosure besides the embodiments disclosed herein can be carried out.

In the following description, a mobile terminal according to the present disclosure may include all devices using an Application Processor (AP), a Graphic Processing Unit (GPU), and a Central Processing Unit (CPU) similar to all information technology equipment, such as a multimedia device and an application device that can provide functions of the present disclosure. For example, the mobile terminal may include a Smart Phone, a Personal Digital Assistant (PDA), a Tablet Personal Computer (Tablet PC), a Portable Multimedia Player (PMP), and the like, which are equipped with an electronic document function.

Figure 1:
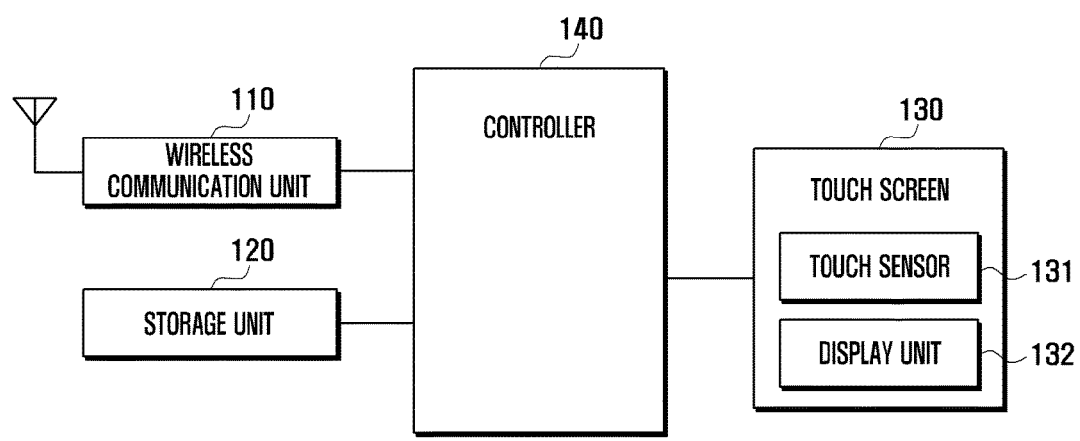
FIG. 1 is a block diagram illustrating a configuration of a mobile terminal according to an embodiment of the present disclosure.

FIG. 1 is a block diagram illustrating a configuration of a mobile terminal according to an embodiment of the present disclosure.

Referring to FIG. 1, the mobile terminal may include a wireless communication unit 110, a storage unit 120, a touch screen 130, and a controller 140. Of course, the mobile terminal of the present disclosure may be configured to have more components than the components illustrated in FIG. 1, or fewer components than that. For example, the mobile terminal according to an embodiment of the present disclosure may include various sensors for detecting various gestures of a user (e.g, an infrared sensor, an illuminance sensor, an image sensor, a proximity sensor, and the like), a Wireless Local Area Network (WLAN) module for supporting the wireless Internet, a local area network module for supporting various local area network technologies (e.g., Bluetooth, Bluetooth Low Energy (BLE), and Near Field Communication (NFC)), and a broadcast reception module for receiving a broadcast signal from an external broadcast management server through a broadcast channel (e.g., a satellite broadcast channel, and a terrestrial broadcast channel).

The wireless communication unit 110 can perform a communication function of the mobile terminal. For example, the wireless communication unit 110 can perform a voice communication, a video communication, and a data communication, by generating a communication channel with a supportable mobile communication network. The wireless communication unit 110 can include a wireless frequency transmitting unit that performs up-conversion and amplification on a frequency of a transmitted signal, a wireless frequency reception signal that performs low-noise amplification and down-conversion on a frequency of a received signal, and the like. Further, the wireless communication unit 110 can include a mobile communication module (e.g., a 3rd generation mobile communication module, a 3.5th generation mobile communication module, or the 4th generation mobile communication module). The wireless communication unit 110 according to an embodiment of the present disclosure can receive an electronic document (e.g., a web page or a web note) that can be connected to various servers and edited.

The storage unit 120 stores a program and data required to operate the mobile terminal, and may be divided into a program area and a data area. The program area can store a program for controlling overall operations of the mobile terminal, an Operating System (OS) for booting the mobile terminal, an application program, and the like. The data area is an area to which data generated according to the usage of the mobile terminal is stored, and can store a still image, a moving image, and the like.

In more detail, the storage unit 120 can store a hovering threshold value for determining proximity (i.e., a hovering state) of an input unit (e.g., an electronic pen, or a user finger) on the touch screen 130. The hovering threshold value can be set as a distance from the touch screen 130 by a certain height value (e.g., 2 cm, 3 cm, 4 cm, etc.). Further, the storage unit 120 can store an electronic document created by the user. The electronic document in the present disclosure can include all types of documents that can be edited by the user. For example, the electronic document may include a note, a memo, a web page, a web note, a web memo, and the like. Further, the storage unit 120 can store setting information regarding a user input method (e.g., a drag input method, a touch-based long press input method, a hovering input method, a direction indicating item display and a selection thereof, a long press input method, or the like) for moving an electronic document screen enlarged while the electronic document is created. The drag input method is an input method of moving the enlarged electronic document screen by the drag operation using a finger in a dragged direction when the electronic pen performs a "hover-in" event over the electronic document screen. The touch-based long press input method is an input method of moving the enlarged electronic document screen by the touch-based long press operation using the input unit on the area (e.g., a screen circumference area) assigned on the electronic document screen in a direction of an area to which a long press is input. The hovering input method is an input method of moving the enlarged electronic document screen by the hovering operation using the input unit on the area (e.g., the screen circumference area) assigned on the electronic document screen in a direction of an area to which the hovering is input. The selecting input method on the direction indicating item is an input method of displaying the direction indicating item for a screen movement on the enlarged electronic document screen and moving the enlarged electronic document screen by a touch (e.g., a tap or a long press) on the direction indicating item using the input unit in a direction indicated by the selected direction indicating item. The hovering input method on the direction indicating item is an input method of displaying the direction indicating item for a screen movement on the enlarged electronic document screen and moving the enlarged electronic document screen by a hovering operation on the direction indicating item using the input unit in a direction indicated by the direction indicating item to which the hovering operation is input.

The touch screen 130 may include a touch sensor 131, and a display unit 132 as input/output means that perform an input function and a display function at the same time. For example, if a touch event or a hovering event (e.g., a hover-in event or a hover-out event) is input by the user through the touch sensor 131 during a screen (e.g., an execution screen of the electronic document (hereinafter, an electronic document screen), a game screen, or a gallery screen) for operating the mobile terminal through the display unit 132 is displayed, the touch screen 130 according to an embodiment of the present disclosure can transmit an input signal in response to the input event to the controller 140. Then, as described below, the controller 140 can divide input events by the user and control operation execution in response to the input event.

The touch sensor 131 can sense a touch event (e.g., a single touch event, a multi-touch event, a touch-based gesture event, an object input event, etc.) by the user who touches the surface of the touch screen 130. When sensing the touch event by the user on the surface of the touch screen 130, the touch sensor 131 can detect coordinates of a point at which the touch event is generated and transmit the detected coordinates to the controller 140. The touch sensor 131 can be configured to convert a change in pressure applied to a specific portion of the display unit 132, capacitance generated at a specific portion of the display unit 132, or the like into an electric input signal. The touch sensor 131 can be configured to detect not only a position and an area of the touched position but also pressure at the time of the touch according to the applied touch method.

Further, the touch sensor 131 can sense a hovering event (e.g., a hover-in event, a hover-out event, etc.) of the user which approaches or moves away a certain distance from the surface of the touch screen 130, generate a signal according to the sensed hovering event, and transmit the signal to the controller 140. Even though a specific input unit is not in contact with the surface of the touch screen 130, the touch sensor 131 can recognize the specific input unit or sense a movement, a release, or the like of the specific input unit by measuring a current amount at a certain distance. The controller 140 can analyze the hovering event by a signal transmitted from the touch sensor 131 and perform a function (e.g., enlarging or reducing the electronic document screen) corresponding to the analyzed hovering event (e.g., the hover-in event or the hover-out event).

The touch sensor 131 in the present disclosure can sense a type of the input unit (e.g., a finger of the user or the electronic pen) which performs an input in a differentiated manner. For example, an input of the finger can be confirmed by recognizing a change of a current at the touched portion, and an input of the electronic pen can be confirmed by sensing transformation of an already-formed electromagnetic field caused by electromagnetic induction.

Further, the touch sensor 131 can receive a user input for executing the electronic document of the present disclosure that can be edited, a user input for inputting an object input when the electronic document is displayed, a user input for moving a screen to a specific direction on the enlarged electronic document screen, and the like. Further, when a corresponding user input is received, the touch sensor 131 can generate an input signal according to the user input.

The display unit 132 can display various screens according to the usage of the mobile terminal. For example, the display unit 132 visually provides a menu, input data, and information in various types to the user. The display unit 132 can be configured with a Liquid Crystal Display (LCD), an Organic Light Emitting Diode (OLED), or the like.

The display unit 132 in the present disclosure can display the electronic document screen which is enlarged or reduced (in the present disclosure, "to reduce" includes returning to the original size of the electronic document screen, or otherwise displaying the electronic document having a smaller size than the present size) under the control of the controller 140. For example, the display unit 132 displays the electronic document screen, enlarges the electronic document screen in response to a hovering event generated by the user in a screen in which the electronic document is displayed, or reduces the enlarged electronic document screen. According to an embodiment, the display unit 132 can enlarge the electronic document screen when the specific input unit (e.g., the finger of the user or the electronic pen) performs the hover-in event according to the hovering gesture by the user, and reduce the electronic document screen when the specific input unit performs a hover-out event according to the hovering gesture by the user. In addition, the display unit 132 can display an object (e.g., a text, an image, a picture, etc.) which is input by the user when the electronic document screen enlarged by the hover-in event of the input unit is displayed.

The display unit 132 can display objects (e.g., a text, an image, a picture, etc.) of the electronic document which are input by the user to be enlarged or reduced corresponding to a ratio of the enlargement or the reduction of the electronic document screen. Further, a direction (e.g., a vertical or horizontal direction) indicating item for indicating a screen movement can be displayed in the enlarged electronic document screen. In addition, the display unit 132 can move and display the enlarged electronic document screen according to the user input.

The controller 140 controls overall operations of the mobile terminal and a signal flow among internal components (e.g., the wireless communication unit 110, the storage unit 120, and the touch screen 130, etc.) of the mobile terminal, performs a function of processing data, and controls power, such as power supplied from a battery, to the components.

The controller 140 of the present disclosure performs a control so that the electronic document screen for creating the electronic document is displayed. The controller 140 can differentiate hover-in/hover-out events of the input unit when the electronic document screen is displayed, and can control an operation of enlarging or reducing the electronic document screen corresponding to the determined ratio according to the hover-in or hover-out event of the input unit.

If the input unit performs the hover-in event in the electronic document screen, the controller 140 performs a control so that the enlarged electronic document screen is displayed.

The controller 140 performs a control so that the electronic pen and the finger are differentiated when the electronic document screen is displayed. The controller 140 can differentiate the type of the input unit and determine an enlargement ratio according to the differentiated type of the input unit. For example, when the electronic document screen is displayed, the controller 140 can differentiate whether the input unit corresponds to the finger of the user or the electronic pen if the input unit performs the hover-in event, and performs a control so that the electronic document screen is enlarged by applying a different enlargement ratio according to the differentiated type of the input unit. For example, if the electronic pen performs a hover-in event over the electronic document screen, the controller 140 can perform a control so that the electronic document screen is enlarged by 150%. Further, if a finger performs the hover-in event over the electronic document screen, the controller 140 can perform a control so that the electronic document screen is enlarged more than the electronic document screen enlarged by the hover-in event of the electronic pen. For example, if the finger performs the hover-in event, the controller 140 can perform a control so that the electronic document screen is enlarged more than the existing electronic document screen, by 200%. The enlargement ratio for each input unit can be embodied in various ways according to the user setting.

The controller 140 can create (e.g., input, display, etc.) the electronic document in response to the user input using the input unit, when the enlarged electronic document screen is displayed. The controller 140 can control the movement of the enlarged electronic document screen by the hover-in event of the input unit of the user. The controller 140 can check the input type for the screen movement of the enlarged electronic document screen. When the user input according to the input type is detected in the area assigned for the screen movement (e.g., an area in which the direction indicating item is displayed, the screen circumference area, etc.) in a state where the enlarged electronic document is displayed, the controller 140 can perform a control so that the enlarged electronic document screen is moved in a specific direction in response to a corresponding user input to be displayed. An input method for the screen movement of the electronic document in the present disclosure can include a drag movement method, a touch-based long press input method, a hovering input method, a selecting input method on a direction indicating item, a long press input method for the direction indicating item, and the like.

When the input unit that performs the hover-in event in a state where the enlarged electronic document screen is displayed performs the hover-out event from the enlarged electronic document screen, the controller 140 performs a control so that the electronic document screen is reduced (e.g., returned) to the original size of the electronic document screen and is displayed on the display unit 132. At this point, the controller 140 can convert the objects of the electronic document which are input by the user into sizes corresponding to the enlargement or reduction ratio of the electronic document screen and display the object.

FIGS. 2A to 2E are diagrams illustrating operations for creating an electronic document by using an electronic pen in a mobile terminal according to an embodiment of the present disclosure.

Referring to FIGS. 2A to 2E, FIG. 2A is a diagram illustrating a state of displaying the electronic document screen in response to the request from the user. The user can select a desired electronic document by a touch input. The controller 140 can execute the electronic document in response to the selection of the user and display the screen thereof. The term "electronic document" as used in the present disclosure refers to any type of document that can be edited by the user and may include a note, a memo, a web page, a web note, a web memo, and the like. FIGS. 2A to 2E illustrate examples of displaying a note screen 215 stored by the user. However, the present disclosure is not limited thereto.

When the electronic document screen in which objects are input as illustrated in FIG. 2A is displayed, the user can cause an electronic pen 210 to perform the hover-in event over an area 220 of a note screen 215 to which the user desires to input (or edit) the objects in order to create (e.g., a text object input for inputting texts by writing) a note as illustrated in FIG. 2B. That is, the user can input a hovering gesture, causing the electronic pen 210 to come into a detectable range (e.g., approach the surface of the touch screen 130 within a certain height) over the touch screen 130.

The controller 140 can sense the hover-in event by reacting to the hovering gesture of the user, enlarge the electronic document screen in response to the hover-in event, and display the enlarged electronic document screen as illustrated in FIG. 2C. The controller 140 can check a coordinate value of the area 220 at which the hover-in event of the electronic pen 210 is sensed, and can perform a control so that the electronic document screen is enlarged by a ratio around the coordinates of the area 220. That is, FIG. 2C is a diagram illustrating a screen of the mobile terminal in a state where the hover-in event is input by the user when the electronic document screen is displayed.

Referring to FIG. 2C, the controller 140 displays the enlarged note screen to the user around the area 220 at which the electronic pen 210 performs the hover-in event. For example, the controller 140 can display the electronic document screen which is currently being displayed when the electronic pen 210 performs the hover-in event by enlarging the electronic document screen by a predetermined screen enlargement ratio (e.g., 150%). The controller 140 performs a control so that the objects created by the user are enlarged when the electronic document screen is enlarged.

Figures 2D, 2E:
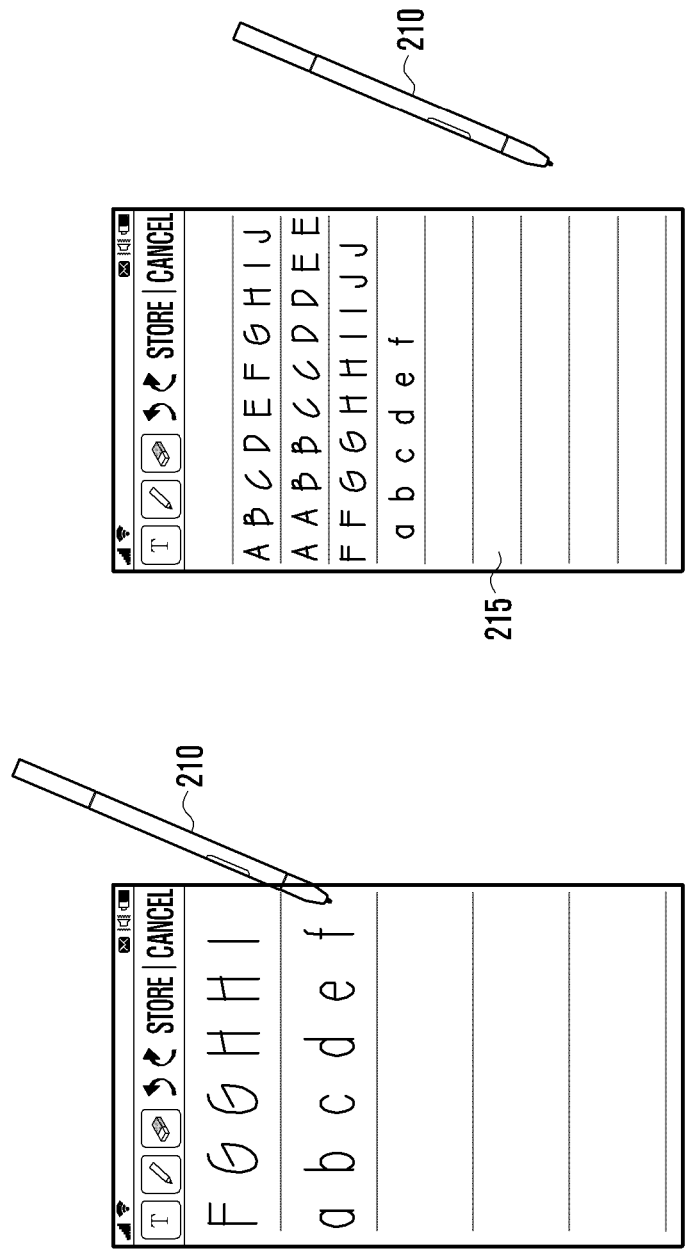

When the note screen is enlarged as illustrated in FIG. 2C, the user can input text objects (e.g., a, b, c, d, e, and f) for creating a note by using the electronic pen 210 as illustrated in FIG. 2D. The controller 140 performs a control so that the text objects (e.g., a, b, c, d, e, and f) created by the user on the enlarged note screen are displayed.

Referring to FIG. 2B or 2C, the user can input the hovering gesture of separating the electronic pen 210 from the touch screen 130 (e.g., causing the electronic pen 210 to deviate from the surface of the touch screen 130 out of a certain height) over the note screen enlarged as illustrated in FIG. 2D. That is, the user can input the hovering gesture in which the electronic pen 210 performs the hover-out event over the enlarged note screen. The controller 140 can sense the hover-out event in response to the hovering gesture, reduce the enlarged note screen, and display the reduced note screen, in response to the hover-out event as illustrated in FIG. 2E. When reducing the note screen, the controller 140 can reduce the objects (e.g., a, b, c, d, e, and f) created by the user and objects which are already input on the enlarged note screen and display the reduced object, corresponding to the reduction ratio of the note screen. That is, FIG. 2E is a diagram illustrating a screen of the mobile terminal when the electronic pen 210 performs the hover-out event after the user inputs the text objects on the enlarged note screen.

As described with reference to FIGS. 2A to 2E, according to various embodiments of the present disclosure, the electronic document screen is enlarged in a state where the input unit (e.g., the electronic pen 210) performs the hover-in event, the object can be input in response to the user input on the enlarged electronic document screen, and the electronic document screen which is displayed in an enlarged manner is reduced to the original size and is displayed if the input unit (e.g., the electronic pen 210) performs the hover-out event.

FIGS. 3A to 3E are diagram illustrating operations of creating an electronic document by using a finger on a mobile terminal according to an embodiment of the present disclosure.

Figure 3C:
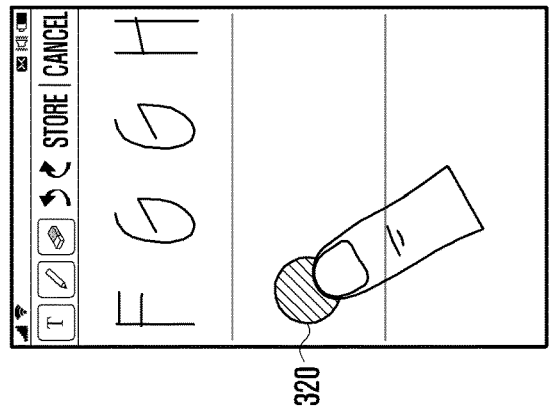
FIGS. 3A, 3B, 3C, 3D, and 3E are diagrams illustrating operations of creating an electronic document by using a finger on a mobile terminal according to an embodiment of the present disclosure.
Figure 3B:
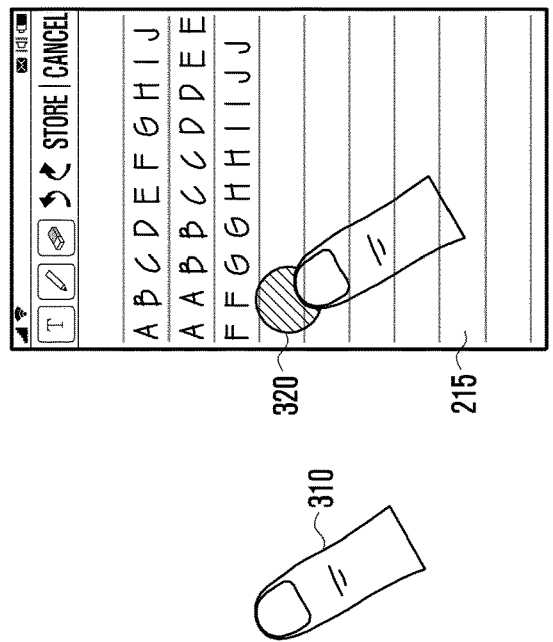
Figure 3A:
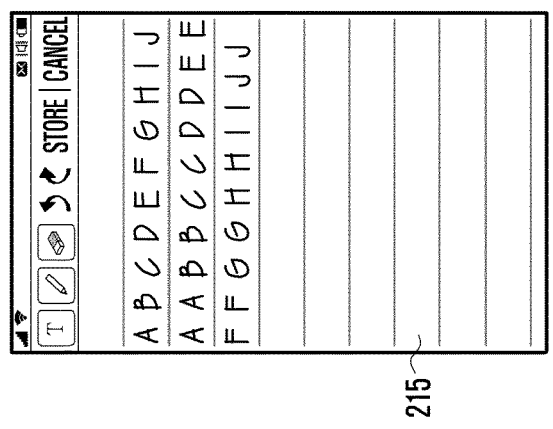

Referring to FIGS. 3A to 3E, FIG. 3A is a diagram illustrating a state in which the electronic document screen is displayed under the request of the user. The user can select a desired electronic document by a touch input. The controller 140 can display the screen thereof by executing the electronic document according to the selection of the user. In a state where the electronic document screen to which the object is input as illustrated in FIG. 3A, the user can cause a finger 310 to perform the hover-in event over an area 320 of the note screen 215 to which the user desires to input objects in order to create a note as illustrated in FIG. 3B. At this point, the controller 140 can check the coordinate value of the certain area 320 at which the hover-in event of the finger 310 is sensed. That is, the user can perform a hovering gesture of causing the finger 310 to come into a detectable range (e.g., approach the surface of the touch screen 130 within a certain height) over the touch screen 130.

Referring to FIG. 3C, the controller 140 can perform a control so that the note screen is enlarged around the area 320 at which the finger 310 performs the hover-in event and is displayed to the user. For example, if the finger 310 performs the hover-in event, the controller 140 can enlarge the electronic document screen which is currently being displayed by a screen ratio (e.g., 200%) and display the enlarged electronic document screen. The controller 140 enlarges the objects created by the user when enlarging the electronic document screen.

Figure 3D:
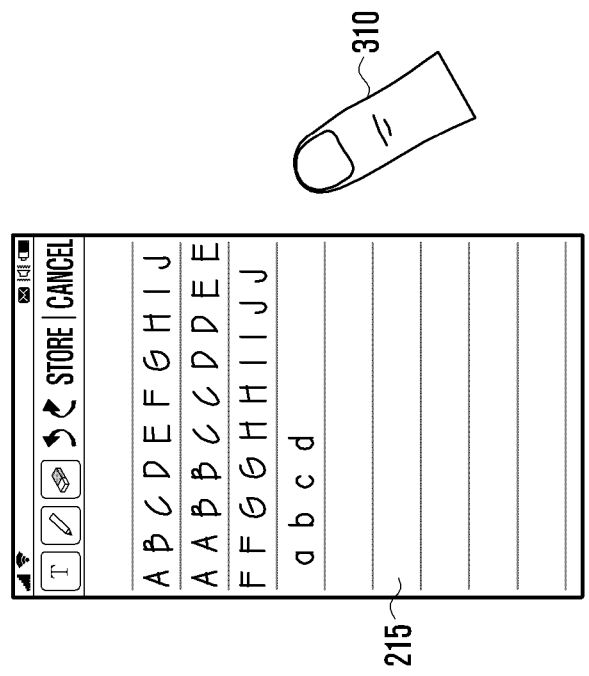

When the note screen is enlarged as illustrated in FIG. 3C, the user can input text objects (e.g., a, b, c, and d) for creating the note by using the finger 310 as illustrated in FIG. 3D. The controller 140 displays the text objects (e.g., a, b, c, and d) created by the user on the enlarged note screen.

Figure 3E:
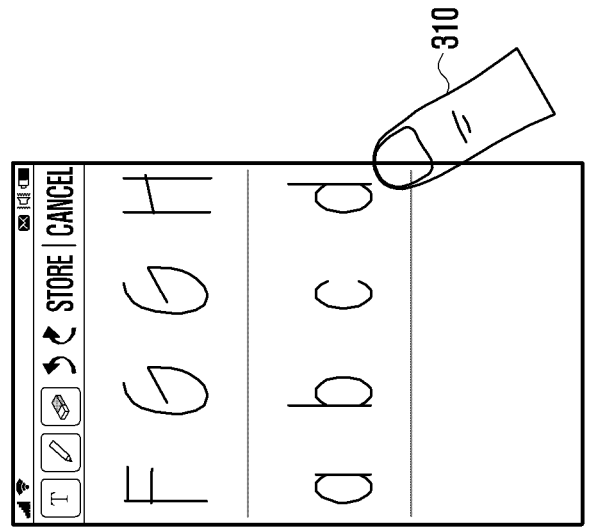

In a state of FIG. 3B or 3C, the user can input a hovering gesture of separating the finger 310 from the touch screen 130 over the enlarged note screen as illustrated in FIG. 3D. That is, the user can input the hovering gesture of causing the finger 310 to perform the hover-out event over the enlarged note screen. The controller 140 can sense the hover-out event in response to the hovering gesture, and can reduce the enlarged note screen in response to the hover-out event and display the reduced note screen as illustrated in FIG. 3E. When reducing the note screen, the controller 140 can reduce the objects (e.g., a, b, c, and d) created by the user and the objects which are already input on the enlarged note screen corresponding to the reduction ratio of the note screen and display the reduced object. That is, FIG. 3E is a diagram illustrating a screen of the mobile terminal when the finger 310 performs the hover-out event after the user inputs the text object on the enlarged note screen.

Referring to FIGS. 3A to 3E, according to various embodiments of the present disclosure, the electronic document screen can be enlarged and displayed when the input unit (e.g., the finger 310) performs the hover-in event, an object can be input in response to the user input on the enlarged electronic document screen, and the enlarged electronic document screen is reduced to the original size and displayed if the input unit (e.g., the finger 310) performs the hover-out event from the enlarged electronic document screen.

Figure 4B:
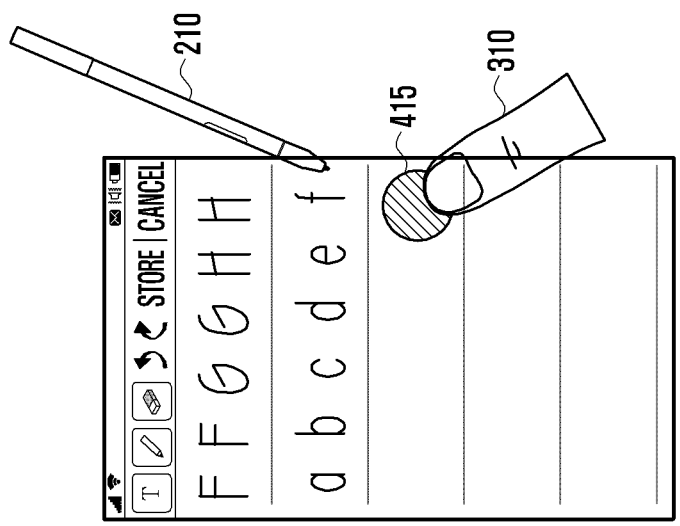
FIGS. 4A and 4B are diagrams illustrating operations of moving an enlarged electronic document screen in a mobile terminal according to an embodiment of the present disclosure.
Figure 4A:
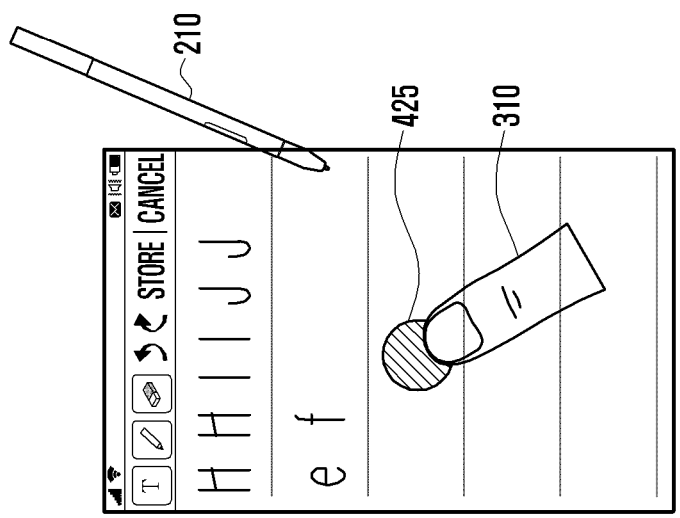

FIGS. 4A to 4B are diagrams illustrating operations of moving an enlarged electronic document screen in a mobile terminal according to an embodiment of the present disclosure.

Referring to FIGS. 4A and 4B, FIG. 4A is a diagram illustrating a screen in a state where the electronic document screen is enlarged in response to the hover-in event of the input unit as described above.

Referring to FIG. 4A, the controller 140 can enlarge the sizes of the objects input to the electronic document corresponding to the enlargement ratio of the electronic document screen and display the enlarged objects when the electronic document screen is enlarged.

Meanwhile, the user can additionally input objects after moving the enlarged electronic document screen in order to create objects in another space of the enlarged electronic document screen that is not displayed as illustrated in FIG. 4A continuously.

According to an embodiment of the present disclosure, the movement of the electronic document screen can be performed by any of various input methods such as a drag input method, a touch-based long press input method, a hovering input method, a selecting input method on a direction indicating item, a long press input method on the direction indicating item, and the like. In FIGS. 4A and 4B, a case of using the drag input method is illustrated as an example.

As illustrated in FIG. 4A, the user can touch a first area 415 of the electronic document screen by using the finger 310 in order to create objects on the enlarged electronic document screen continuously. Further, the user can input a drag that moves a touch input to the first area 415 in a direction of a second area 425 as illustrated in FIG. 4B.

Here, the controller 140 can differentiate multi-inputs by the electronic pen 210 and the finger 310 in order to support a screen movement by the drag input method by using the finger 310 of the user when the screen is enlarged by the hover-in event of the electronic pen 210. For example, in the examples of FIGS. 4A and 4B, the electronic pen 210 can be recognized by a hover-in input for maintaining the enlargement state of the electronic document screen and a touch input for creating the electronic document, and the finger 310 can be recognized by a touch input and moving the enlarged electronic document screen. Further, according to an embodiment of the present disclosure, if a multi-input of the input units, that is, the touch input of the finger 310 in a state of the hover-in event by the electronic pen 210, is performed, the controller 140 can recognize a capacitance change different from a capacitance change generated by the electronic pen 210 as a touch input by the finger 310. Further, in the examples illustrated in FIGS. 4A and 4B, it is illustrated that the drag input moves from the right to the left, but the present disclosure is not limited thereto. Therefore, the drag input for moving the electronic document screen can be input for every direction, such as upper, lower, left, right, and diagonal directions.

The controller 140 can move and display the enlarged electronic document screen in response to the drag input by the finger 310 of the user as illustrated in FIG. 4B in a state where the electronic document screen is enlarged and displayed according to the hover-in event of the electronic pen 210. As illustrated in FIG. 4B, the controller 140 can move and display the electronic document screen in a direction of the drag input of the user.

The user can continuously input objects by using the electronic pen 210 on the electronic document screen which is dragged and moved by the user. At this point, even if the electronic document screen is moved, the controller 140 can maintain the electronic document screen which is enlarged while the hover-in event by the electronic pen 210 is sensed. Therefore, the user can continuously create notes without reducing the screen when creating the notes in a state where the screen is enlarged.

Figure 5B:
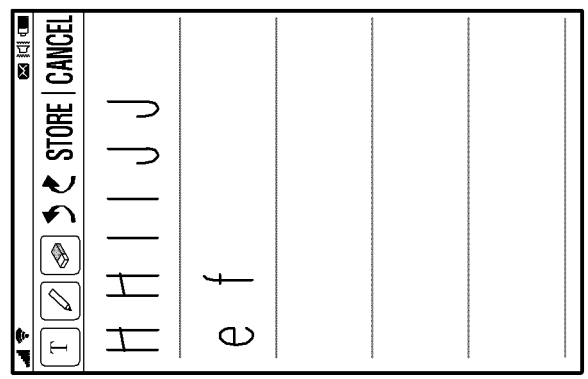
FIGS. 5A and 5B are diagrams illustrating operations when an enlarged electronic document screen is moved in a mobile terminal according to an embodiment of the present disclosure.
Figure 5A:
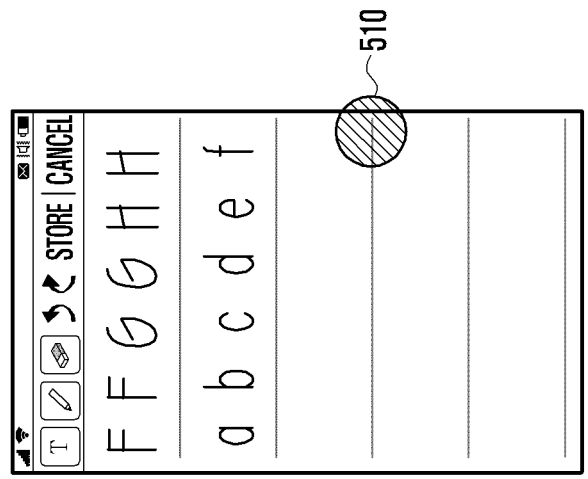

FIGS. 5A and 5B are diagrams illustrating operations when an enlarged electronic document screen is moved in a mobile terminal according to an embodiment of the present disclosure.

Referring to FIGS. 5A and 5B, FIG. 5A illustrates a screen in a state where an electronic document screen is enlarged in response to a hover-in event of an input unit, such as the input unit as described above. As illustrated in FIG. 5A, when the electronic document screen is enlarged, the controller 140 can enlarge the sizes of the objects input to the electronic document in response to the enlargement ratio of the electronic document screen and display the electronic document. Meanwhile, the user can move the enlarged electronic document screen and additionally input an object in order to continuously create an object at another space which is not displayed on the enlarged electronic document screen as illustrated in FIG. 5A.

According to an embodiment of the present disclosure, the movement of the electronic document screen can be performed by any one of the set input methods among the drag input method, the touch-based long press input method, the hovering input method, the selecting input method on a direction indicating item, and the hovering input method over the direction indicating item. In FIGS. 5A and 5B, a case of using the touch-based long press input method and the hovering input method is described as an example.

As illustrated in FIG. 5A, the user can perform a touch-based long press input or a hovering input using an input unit to an area 510 assigned by the input unit in order to continuously create an object on the enlarged electronic document screen. The assigned area 510 can be the circumference area of the enlarged electronic document screen. At this point, the input unit may be any one of the electronic pen and the finger. At this point, the controller 140 calculates a time during which the input unit is detected on the assigned area 510. If the input unit is detected on the assigned area 510 for a certain period of time, the controller 140 can move the electronic document screen in the detected direction and display the electronic document screen. Further, in the example of FIGS. 5A and 5B, it is described that, in a state where the note screen is enlarged, if the time when the input unit is detected on the right portion of the circumference area of the note screen is calculated and a certain period of time is passed, the input unit moves the screen in the right direction as detected. However, the present disclosure is not limited thereto. Therefore, the touch-based long press input and the hovering input for moving the electronic document screen can be input in any direction, such as the upper, lower, left, right, and diagonal directions.

In a state where the electronic document screen is enlarged according to the hover-in event of the input unit, the controller 140 can move and display the enlarged electronic document screen in response to the long-press input or the hovering input by the user input, as illustrated in FIG. 5B. As illustrated in FIG. 5B, the controller 140 can move and display the enlarged electronic document screen in the direction of the long press input or the hovering input by the user.

The user can continuously input objects by using the input unit on the moved electronic document screen. At this point, even if the electronic document screen is moved, the controller 140 can maintain the enlarged note screen while the hover-in event by the input unit is sensed. Therefore, the user can continuously create a note without reducing the screen when creating the note in a state where the screen is enlarged.

Figure 6A:
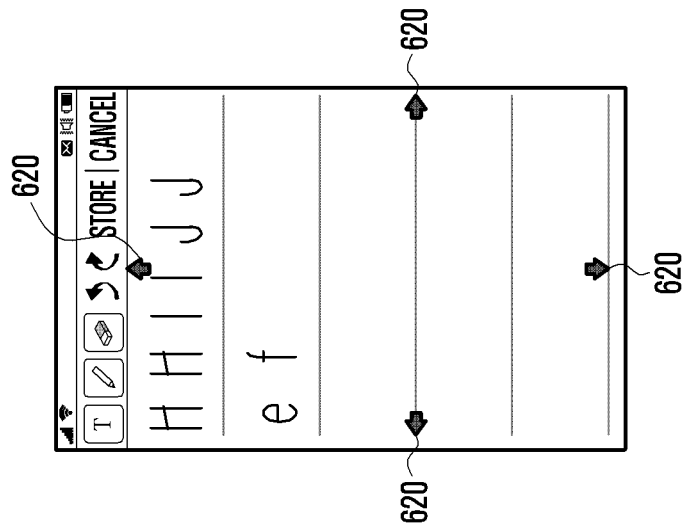
FIGS. 6A and 6B are diagrams illustrating an operation when an enlarged electronic document screen is moved in a mobile terminal according to an embodiment of the present disclosure.
Figure 6B:
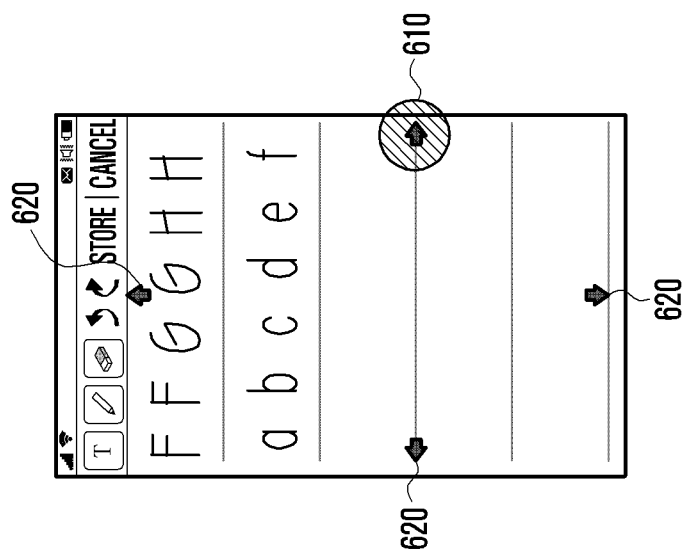

FIGS. 6A and 6B are diagrams illustrating an operation when an enlarged electronic document screen is moved in a mobile terminal according to an embodiment of the present disclosure.

Referring to FIGS. 6A and 6B, FIG. 6A illustrates an example of an electronic document screen which is enlarged in response to a hover-in event of an input unit, such as the input unit as described above. As illustrated in FIG. 6A, when the electronic document screen is enlarged, the controller 140 can enlarge the size of the objects input to the electronic document in response to the enlargement ratio of the electronic document screen and display the enlarged objects. Meanwhile, in order to continuously create an object at another space which is not displayed in the enlarged electronic document screen as illustrated in FIG. 6A, the user can move the enlarged electronic document screen and additionally input the object. According to the embodiment of the present disclosure, the movement of the electronic document screen can be performed by any one of set input methods among the drag input method, the touch-based long press input method, the hovering input method, the selecting input method on a direction indicating item, the hovering input method over the direction indicating item, and the like. In FIGS. 6A and 6B, a case of using the touch-based long press input method and the hovering input method is used is described as an example.

As illustrated in FIG. 6A, the controller 140 can activate and display a direction indicating item 620 for moving a screen on the enlarged electronic document screen. Therefore, the user can move the screen by using the direction indicating item 620 on the enlarged electronic document screen. At this point, the user can perform an input on the activated direction indicating item 620 by using the input unit. Then, the controller 140 can confirm the input as an input for moving the screen, and move and display the electronic document screen in the direction input by the user. At this point, the input unit may correspond to any one of the electronic pen or the finger. Further, the user input for the movement in a state where the note screen is enlarged may include both of the selecting input on the direction indicating item and the hovering input over the direction indicating item.

Referring to FIGS. 6A and 6B, the user can create a note by using the input unit on the enlarged note screen as illustrated in FIG. 6A. In the enlarged note screen, the user may desire to move the enlarged note screen in order to continuously create objects. If the note screen is enlarged as illustrated in FIG. 6A, the controller 140 can display the direction indicating item 620 on the screen. The user can perform an input on the direction indicating item 620 in the right direction as indicated by a certain area 610. At this point, the controller 140 recognizes the selecting input on the direction indicating item and the hovering input over the direction indicating item by the input unit and determines that an input on the certain area 610 is performed on the enlarged note screen. Further, in the example of FIGS. 6A and 6B, a case in which the direction indicating item 620 is displayed in the state where the note screen is enlarged, the note screen is moved in the corresponding direction if an input is performed on the direction indicating item 620 is provided as an example. However, the present disclosure is not limited thereto. Therefore, the input for moving the electronic document screen can be performed in every direction in which the user desires to move among various directions, such as upper, lower, left, right, and diagonal directions which are indicated by the direction indicating item 620. Meanwhile, in a state where the electronic document screen is enlarged in response to the hover-in event of the input unit and displayed, the controller 140 can move and display the enlarged electronic document screen in response to the selection input on the direction indicating item and the hovering input over the direction indicating item by the input unit of the user as illustrated in FIG. 6B. As illustrated in FIG. 6B, the controller 140 can move and display the enlarged electronic document screen in the direction of the selection input on the direction indicating item or the hovering input over the direction indicating item.

The user can continuously input objects by using the input unit on the electronic document screen moved according to the selection input on the direction indicating item or the hovering input over the direction indicating item by the user. At this point, the controller 140 can maintain the enlarged electronic document screen while the hover-in event by the input unit is sensed even if the electronic document screen is moved. Therefore, the user can continuously create the note without reducing the screen when creating the note in a state where the screen is enlarged.

Figure 7:
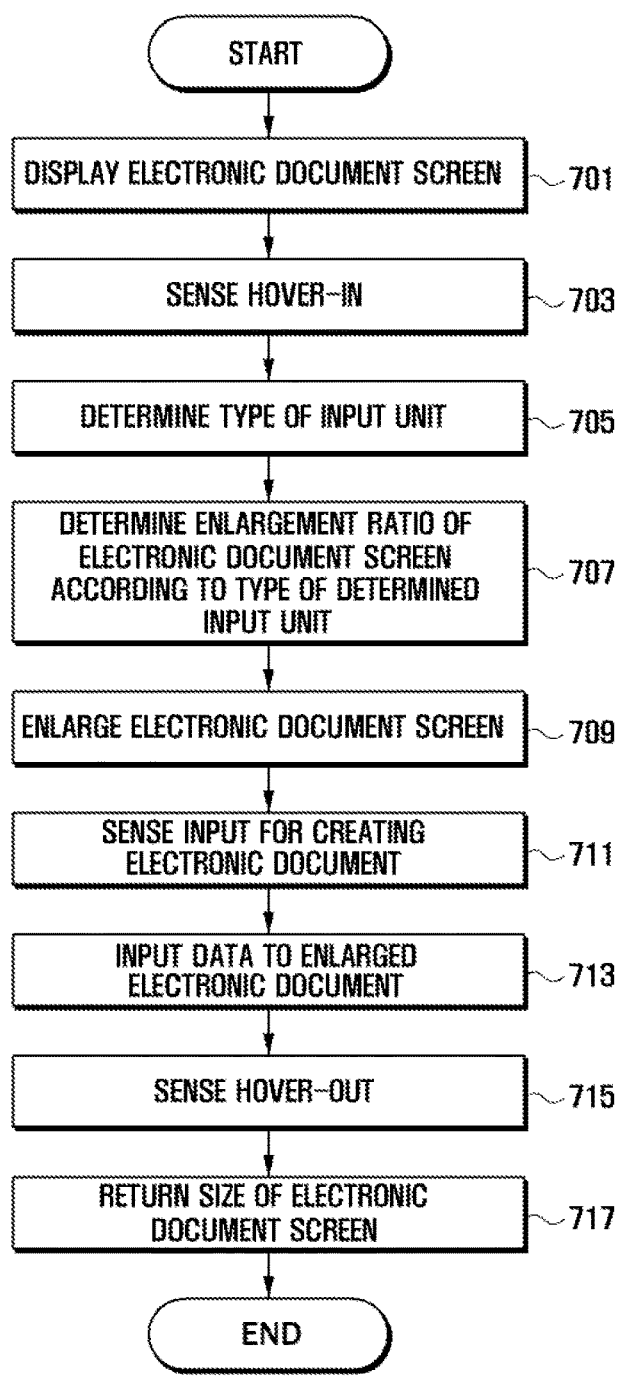
FIG. 7 is a flowchart illustrating a method of creating an electronic document in a mobile terminal according to an embodiment of the present disclosure.

FIG. 7 is a flowchart illustrating a method of creating an electronic document in a mobile terminal according to an embodiment of the present disclosure.

Referring to FIG. 7, the controller 140 can control the display of an electronic document screen in operation 701. For example, the controller 140 can execute an electronic document requested by the user and control the display of the electronic document screen accordingly. The electronic document according to the present disclosure can receive a user input, and can include all types of editable documents that can display various objects (e.g., texts, images, pictures, etc.) corresponding to the user input.

In operation 703, the controller 140 can sense the hover-in event in which a specific input unit approaches over the touch screen 130. For example, the user can input a hovering gesture in which the specific input unit is entered within a certain distance (e.g., a hovering threshold value) from the surface of the touch screen 130 in a state where the electronic document screen is displayed, and the controller 140 can detect the hover-in event in response to the hovering gesture.

If the controller 140 senses the hover-in event of the input unit, the controller 140 can determine the type of input unit that performs the hover-in event in operation 705. For example, the controller 140 can differentiate the hover-in events of the finger and the electronic pen. The controller 140 can differentiate the finger and the electronic pen based on standard values in relation to a change in capacitance, electromagnetic induction, and the like which are sensed by the input unit.

In operation 707, the controller 140 can determine the enlargement ratio of the electronic document screen according to the type of the input unit. For example, the enlargement ratios of the screen are different according to the electronic pen and the finger according to embodiments of the present disclosure. For example, in the case of a finger, an area of the portion to which a touch input is performed on the touch screen 130 is larger than that in the case of an electronic pen. Therefore, the enlargement ratio of the screen for the finger can be set to be larger in order to support a more delicate object input. For example, in the case of the electronic pen, if the enlargement ratio for the electronic pen is set to be 150%, the enlargement ratio for the finger can be set to be a larger ratio (e.g., 200%) than 150%. According to an embodiment of the present disclosure, a case in which the enlargement ratio is set to be different for each input unit that performs the hover-in event is described as an example, but the present disclosure is not limited thereto. Therefore, according to embodiments of the present disclosure, the screen can be supported to be enlarged in the same enlargement ratio regardless of the types of input units.

In operation 709, the controller 140 can control the enlargement display of the electronic document screen in response to the hover-in event of the input unit. The controller 140 can control the enlargement of the electronic document screen around a position where the input unit performs the hover-in event according to the enlargement ratio of the screen which is determined with respect to the input unit. For example, if the electronic pen performs the hover-in event, the controller 140 can enlarge the electronic document screen according to the enlargement ratio (e.g., 150%) with respect to the hover-in event of the electronic pen. If the finger performs the hover-in event, the controller 140 can enlarge the electronic document screen according to the enlargement ratio (e.g., 200%) with respect to the hover-in event of the finger. Here, while the hover-in event by the input unit is maintained, the controller 140 can maintain the enlargement display of the electronic document screen. At this point, the input unit by the user can be in the hovering state or in a state of being in contact with the surface of the touch screen 130 for inputting a specific object (e.g., a text, an image, or a picture).

In operation 711, the controller 140 can sense the touch input of the input unit for creating the electronic document on the enlarged electronic document screen. The controller 140 can sense a signal corresponding to the user input for inputting the specific object on the electronic document in a state where the electronic document is enlarged by the hover-in event of the input unit. The controller 140 can sense the touch input of the input unit as an input for creating the electronic document. According to an embodiment of the present disclosure, a signal corresponding to the user input may include at least one gesture by the user (e.g., a writing input or a drawing input).

In operation 713, the controller 140 can input an object on the enlarged electronic document screen in response to the touch input of the user and display the object. That is, in a state where the enlarged electronic document screen is maintained, the controller 140 can recognize the user input (e.g., a touch-based writing input or a touch-based drawing input) by the input unit and control the object displayed corresponding to the user input.

In operation 715, the controller 140 can sense the hover-out event in which the input unit is moved away from the touch screen 130. That is, the controller 140 can sense the hover-out of the input unit that has performed the hover-in event over the enlarged electronic document screen. For example, in a state where the enlarged electronic document screen is displayed, the user can input a hovering gesture in which the input unit is separated from the touch screen 130 by a distance equal to or farther than a certain distance, and the controller 140 can detect the hover-out event in response to the hovering gesture.

In operation 717, if the hover-out event is sensed, the controller 140 can reduce the size of the enlarged electronic document screen, for example to an original size of the electronic document screen, and display the reduced electronic document screen. At this point, when the electronic document screen is reduced, the controller 140 can perform a control so that the objects created by the user are also reduced corresponding to the reduction ratio of the electronic document screen.

Figure 8:
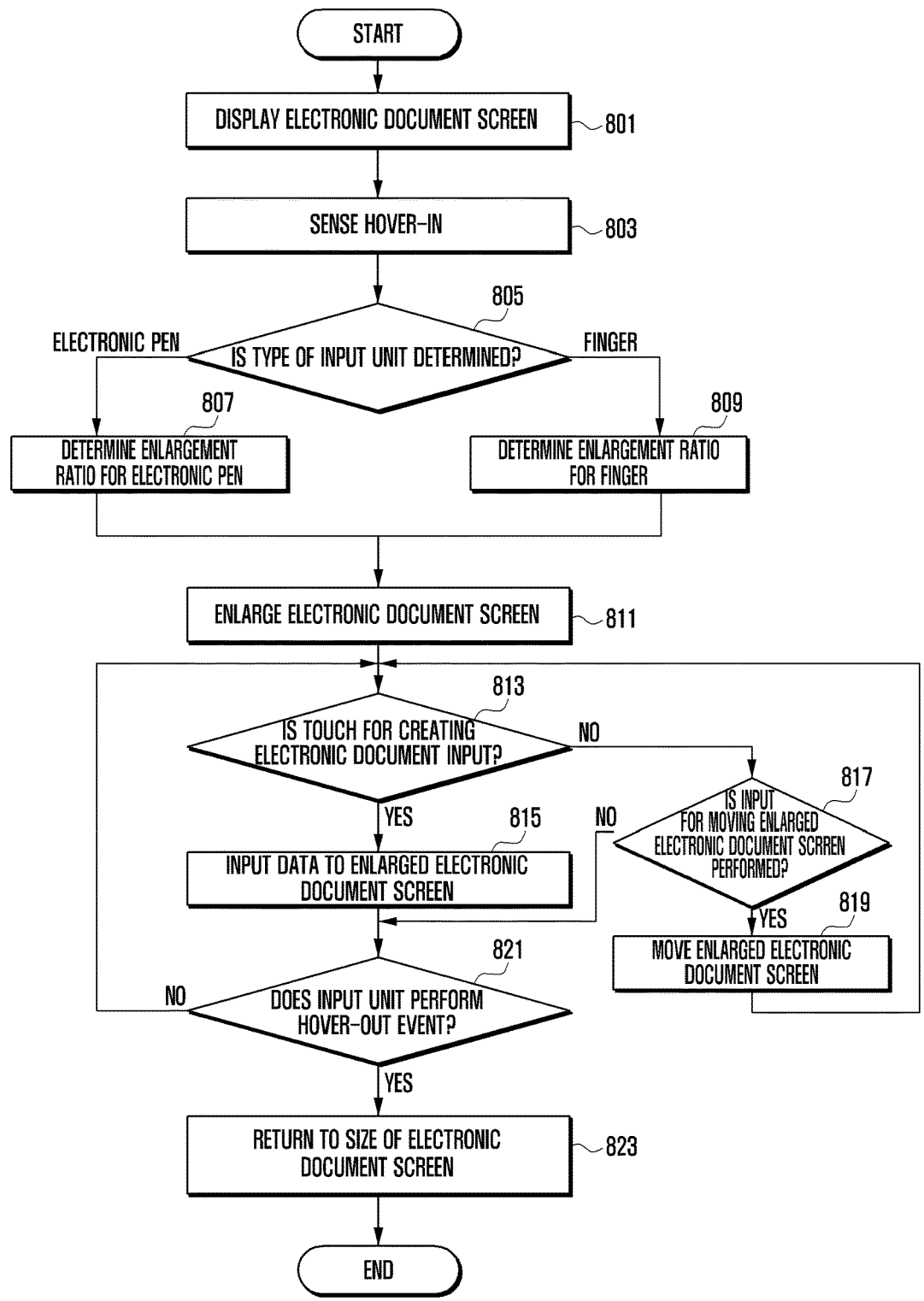
FIG. 8 is a flowchart illustrating a method of creating an electronic document in a mobile terminal according to an embodiment of the present disclosure.

FIG. 8 is a flowchart illustrating a method of creating an electronic document in a mobile terminal according to an embodiment of the present disclosure in detail.

Referring to FIG. 8, the controller 140 can perform a control of the display of the electronic document screen in operation 801. For example, the controller 140 can execute an electronic document requested by the user and control the display of the electronic document screen accordingly. According to an embodiment of the present disclosure, the electronic document can receive the user input and can include all types of editable documents that can display various objects corresponding to the user input.

In operation 803, the controller 140 can sense the hover-in event in which the specific input unit approaches over the touch screen 130. For example, in a state where the electronic document screen is displayed, the user can input a hovering gesture in which the specific input unit is entered within a certain distance (e.g., the hovering threshold value) from the surface of the touch screen 130, and the controller 140 can detect the hover-in event in response to the hovering gesture.

In operation 805, the controller 140 determines the type of input unit when the input unit performs the hover-in event over the electronic document screen. The controller 140 can differentiate between a finger of the user and an electronic pen based on standard values in relation to a change in capacitance, electromagnetic induction, and the like which are sensed by the input unit. If it is determined that the type of input unit is the electronic pen in operation 805, the controller 140 determines the enlargement ratio of the electronic document screen appropriate for the electronic pen in operation 807. If it is determined that the type of input unit is the finger in operation 805, the controller 140 can determine the enlargement ratio of the electronic document screen appropriate for the finger in operation 809. At this point, the enlargement ratios of the screen appropriate for the electronic pen and the finger are displayed to be different from each other. For example, in the case of the finger, an area of the portion to which a touch input is performed on the touch screen 130 is larger than in the case of the electronic pen. Therefore, the enlargement ratio of the screen for the finger can be set to be larger in order to support a more delicate object input.

In operation 811, the enlargement display of the electronic document screen can be controlled in response to the hover-in event of the input unit. The controller 140 can control the enlargement of the electronic document screen around the position where the input unit performs the hover-in event according to the enlargement ratio of the screen which is determined with respect to the input unit.

In operation 813, the controller 140 can sense the touch input of the touch unit for creating the electronic document on the enlarged electronic document screen. The controller 140 can sense a signal corresponding to the user input for inputting the specific object on the electronic document in a state where the electronic document is enlarged by the hover-in event of the input unit. The controller 140 can sense the touch input of the input unit as an input for creating the electronic document.

In operation 815, the controller 140 can input an object on the enlarged electronic document screen in response to the touch input of the user and display the object. That is, in a state where the enlarged electronic document screen is maintained, the controller 140 can recognize the user input by the input unit and control the object displayed corresponding to the user input.

If the input unit does not perform a touch input in operation 813, the controller 140 checks whether there is an input for moving the screen by the electronic document in operation 817. According to an embodiment of the present disclosure, the movement of the electronic document screen can be performed by any one of set input methods, such as the drag input method, the touch-based long press input method, the hovering input method, the input method of selecting a direction indicating item, the hovering input method over the direction indicating item, and the like. Referring to FIGS. 5A and 5B, the touch-based long press input method, the hovering input method, and the like are performed. If there is an input for moving the electronic document screen in operation 817, the controller 140 moves the electronic document screen in the direction input by the user and displays the electronic document screen in operation 819.

In operation 821, the controller 140 can sense the hover-out event in which the input unit is moved away from the touch screen 130. That is, the controller 140 can sense the hover-out event of the input unit that has performed the hover-in event over the enlarged electronic document screen.

In operation 823, if the hover-out event is sensed, the controller 140 can reduce the size of the enlarged electronic document screen, such as reduct the size to the original size of the electronic document screen, and display the reduced electronic document screen. At this point, the controller 140 can perform a control so that the objects created by the user are also reduced corresponding to the reduction ratio of the electronic document screen and are displayed when reducing the electronic document.

Although the method and the apparatus for managing the audio data of the electronic device according to embodiments of the present disclosure have been described through the specification and drawings by using specific terms, the embodiments and the terms are merely used as general meanings to more easily describe technical contents of the present disclosure and assist in an understanding of the present disclosure, and the present disclosure is not limited to the described embodiments. That is, it should be apparent to those skilled in the art that other various embodiments based on the technical idea of the present disclosure can be implemented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of creating an electronic document in a mobile terminal, the method comprising:
   displaying an electronic document screen;
   sensing a hover-in event of an input unit when the electronic document screen is displayed;
   determining an enlargement ratio of the electronic document screen according to a type of the input unit that performs the hover-in event;
   enlarging a size of the electronic document screen in response to the determined enlargement ratio;
   receiving touch-based writing data by the input unit in a state where the enlarged electronic document screen is maintained;
   displaying the received touch-based writing data by a size corresponding to the determined enlargement ratio according to a movement of the input unit on the enlarged electronic document screen when the electronic document screen is enlarged;
   in response to a hover-out event of the input unit, reducing the size of the enlarged electronic document screen; and
   reducing a display of the touch-based writing data displayed by a size corresponding to a reduction ratio of the electronic document when reducing the enlarged electronic document screen.

2. The method according to claim 1, wherein the enlarging of the size of the electronic document screen comprises:
   enlarging the electronic document screen around a coordinate value of the input unit that performs the hover-in event.

3. The method according to claim 1, further comprising:
   moving the screen according to a user input on the enlarged electronic document screen.

4. The method according to claim 3, wherein the moving of the screen includes moving the screen by any one of a drag input method, a touch-based long press input method, a hovering input method, a selection input method on a direction indicating item, and a hovering input method over the direction indicating item.

5. An apparatus for creating an electronic document in a mobile terminal, the apparatus comprising:
   a display unit configured to display an electronic document screen;
   a touch sensor configured to:
      detect a user input when the electronic document screen is displayed, and
      sense a hover-in or a hover out event of an input unit when the electronic document screen is displayed; and
   a controller configured to:
      determine an enlargement ratio of the electronic document screen according to a type of the input unit that performs the hover-in event;
      enlarge a size of the electronic document screen in response to the determined enlargement ratio;
      receive touch-based writing data by the input unit in a state where the enlarged electronic document screen is maintained;
      display the received touch-based writing data by a size corresponding to the determined enlargement ratio according to a movement of the input unit on the enlarged electronic document screen when the electronic document screen is enlarged;

in response to a hover-out event of the input unit, reduce the size of the enlarged electronic document screen; and reduce a display of the touch-based writing data displayed by a size corresponding to a reduction ratio of the electronic document when reducing the enlarged electronic document screen.

6. The apparatus according to claim 5, wherein the controller is further configured to enlarge the electronic document screen around a coordinate value of the input unit that performs the hover-in event.

7. The apparatus according to claim 5, wherein the controller is further configured to move the screen according to a user input on the enlarged electronic document screen.

8. The apparatus according to claim 7, wherein the controller is further configured to move the screen by any one of a drag input method, a touch-based long press input method, a hovering input method, a selection input method on a direction indicating item, and a hovering input method over the direction indicating item.

9. The apparatus according to claim 5, wherein the hover-in event comprises:

an input in which the input unit is moved in to a certain height over the electronic document screen and the electronic document screen is resized according to a resize ratio for each type of input unit.

10. The apparatus according to claim 5, wherein the hover-out event comprises an input in which the input unit is moved out a certain height over the electronic document screen, and wherein the resized electronic document screen is displayed to a full screen.

* * * * *